Dec. 13, 1966  E. A. MEYER  3,290,852
ADAPTOR CLIP FOR FASTENER ASSEMBLY
Filed Aug. 8, 1963  3 Sheets-Sheet 1

INVENTOR.
ENGELBERT A. MEYER
BY Burton & Parker
ATTORNEYS

Dec. 13, 1966          E. A. MEYER                3,290,852
              ADAPTOR CLIP FOR FASTENER ASSEMBLY
Filed Aug. 8, 1963                          3 Sheets-Sheet 2
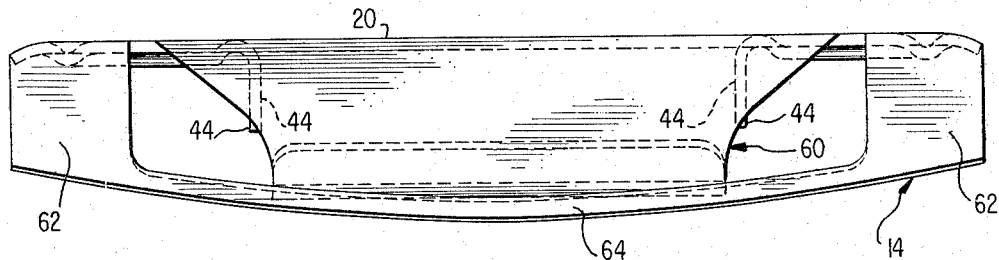
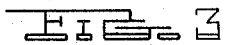
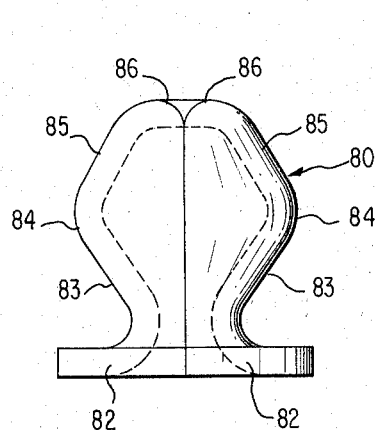
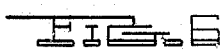
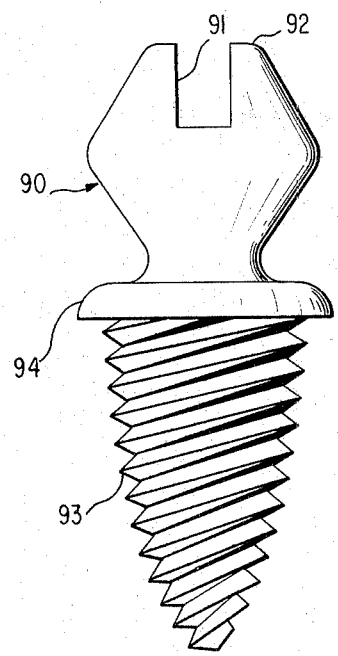
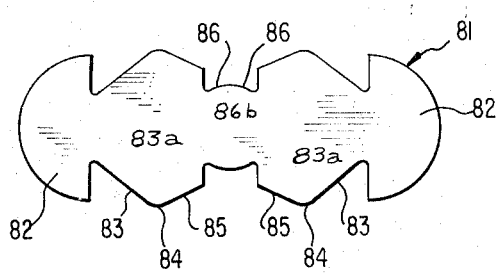
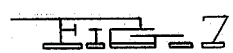
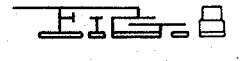
INVENTOR.
ENGELBERT A. MEYER
BY *Burton + Parker*
ATTORNEYS Dec. 13, 1966  E. A. MEYER  3,290,852
ADAPTOR CLIP FOR FASTENER ASSEMBLY
Filed Aug. 8, 1963  3 Sheets-Sheet 3
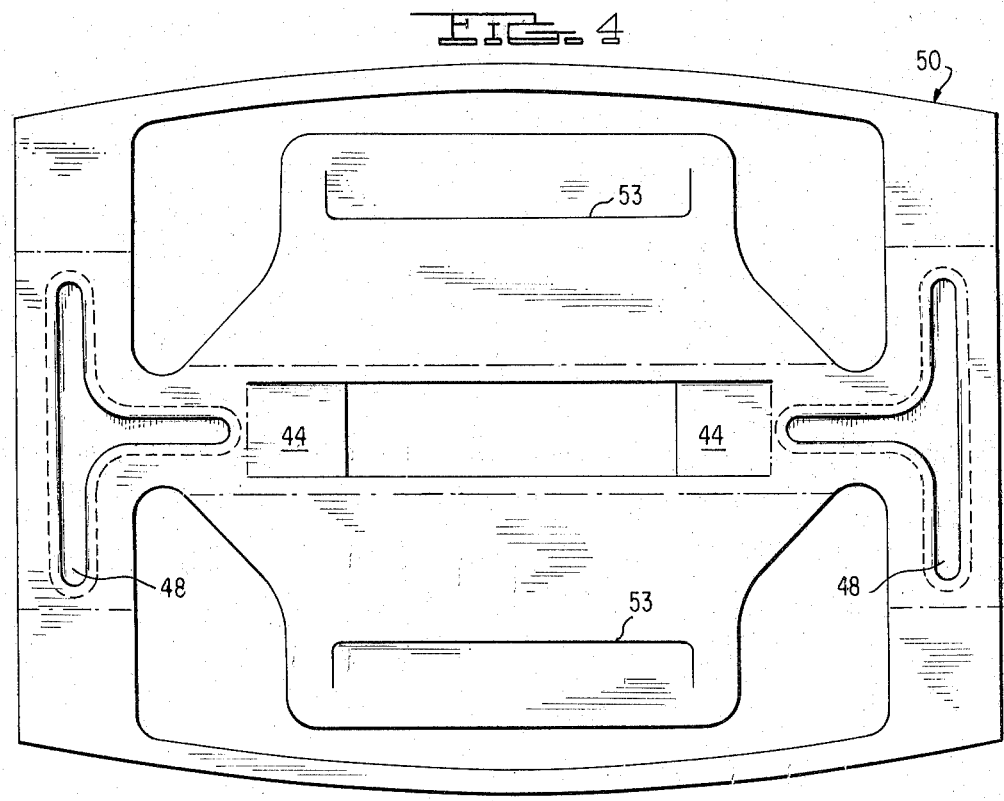
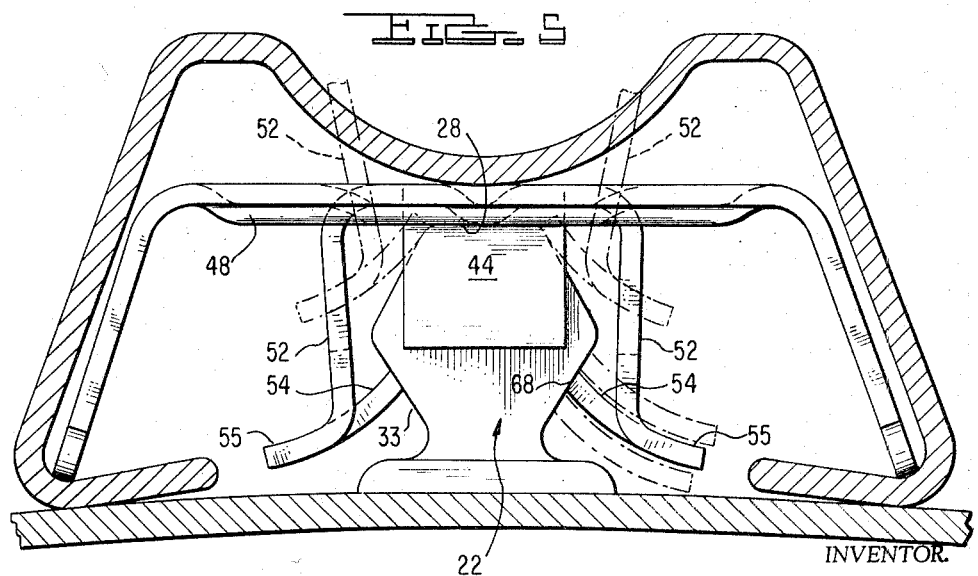
INVENTOR.
ENGELBERT A. MEYER
BY Burton + Parker
ATTORNEYS

United States Patent Office

3,290,852
Patented Dec. 13, 1966

3,290,852
ADAPTOR CLIP FOR FASTENER ASSEMBLY
Engelbert A. Meyer, Union Lake, Mich., assignor to Chicago United Products Company, Inc., Detroit, Mich., a corporation of Michigan
Filed Aug. 8, 1963, Ser. No. 300,942
3 Claims. (Cl. 52—717)

This invention relates to an improved molding assembly and more particularly to the fastener elements making up the assembly, which include a button extending from a support.

Molding devices are used in the manufacture of automobiles, refrigerators, and the like to meet functional and design requirements.

Preferably the button is attached to the support in accordance with the invention shown in the co-pending application of the assignee of the instant application, Serial No. 179,128, now Patent No. 3,153,468, wherein the button is welded to steel thereby eliminating the corrosion problem inherent in previously used techniques requiring a hole through the support. A series of spaced buttons for a single longitudinal molding device may be applied in a gang operation with accurate alignment.

The button is small; somewhat miniature in size in comparison to previously used fasteners in the automobile trim field, the maximum diameter being about .170 inch.

The object of this invention is to provide a single piece female clip formed of sheet material by cutting and bending processes. The clip may be longitudinally slid into a hollow molding device and frictionally retained therein by a wedge fit at a predetermined location. The clip may be economically manufactured from strip sheet material by standard stamping and bending or forming machines, a feature of the instant invention being that a minimum of basic sheet material is wasted. This is accomplished by utilizing internal portions of the sheet material to form required parts of the single piece clip.

The clip is cut, bent and formed into a sled having outwardly bowed runners designed to engage channels formed by opposed inturned flanges of a longitudinal trim strip or hollow member as used on automobiles. The runners and the top of the sled define outer peripheral contact points and areas designed to conform with the inner surface of the trim strip in a manner which inwardly stresses the runners on insertion into the strip producing an outward bias of the sled against the trim strip, thereby frictionally maintaining the clip in place. A socket depends from the top of the clip and is designed for aligning and locking coaction with a button of particular design.

The button used with the clip discussed above may be manufactured from solid stock, or formed from sheet material bent into the desired shape. The button has a top conoidal cam which expands catch panels of the clip socket outwardly for passage past a convex band into abutting camming engagement with a bottom inverted conoidal face. As will be explained, the clip is first assembled in a wedged fixed position in the trim strip, the resulting assembly then being pressed onto the button to accomplish the outward camming of the catch panel to enable an inwardly and upwardly expanding catch to engage the inverted conoidal face, thereby locking the trim strip in place. The assembly forces produced when the trim strip is pressed home against the automobile support are transmitted from the trim strip through the top of the clip to the other parts thereof.

The catch of the socket which actually engages the button to hold the trim strip in place may be formed in various manners, one being by bending the catch panel inwardly and upwardly, and the other being by the provision of a U-shaped cut-out portion in said catch panel which is bent out of the plane of the catch panel about its bottom connection therewith. It will be noted that this invention is being discussed in the context of an automobile trim strip assembly, and further, for purposes of convenience, the elements will be considered in a vertical attitude though other attitudes are obviously intended.

Other objects, advantages and meritorious features will more fully appear from the following specifications, claims and accompanying drawings, wherein:

FIG. 3 is a side view of the clip of FIG. 2;

FIG. 4 is a top plan view showing a modification of a single piece female clip in blank, formed by a stamping operation;

FIG. 5 is a view similar to FIG. 2, but with the clip of FIG. 4 shown therein;

FIG. 6 is a side view of a button made from a stamping of sheet material;

FIG. 7 is a plan view of the blank from which the button of FIG. 6 is formed; and FIG. 8 is a side view of a replacement button, useable where welding or adhesive methods are not available.

Figure 1:
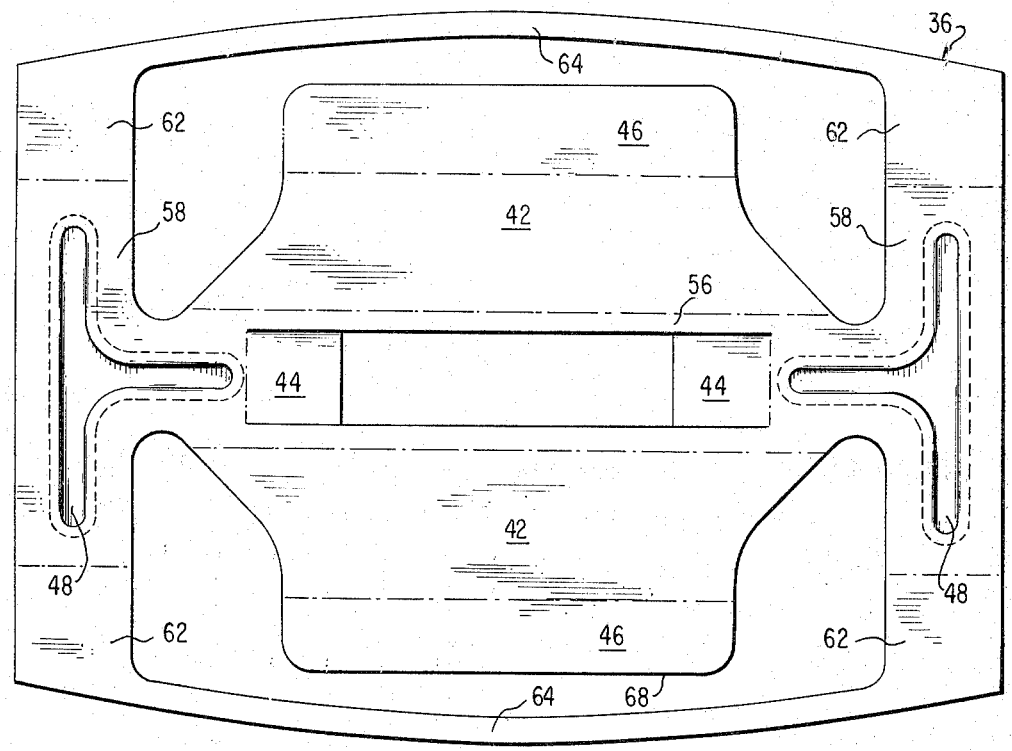
FIG. 1 is a top plan view showing the single piece female clip in blank, formed by a stamping operation.
Figure 2:
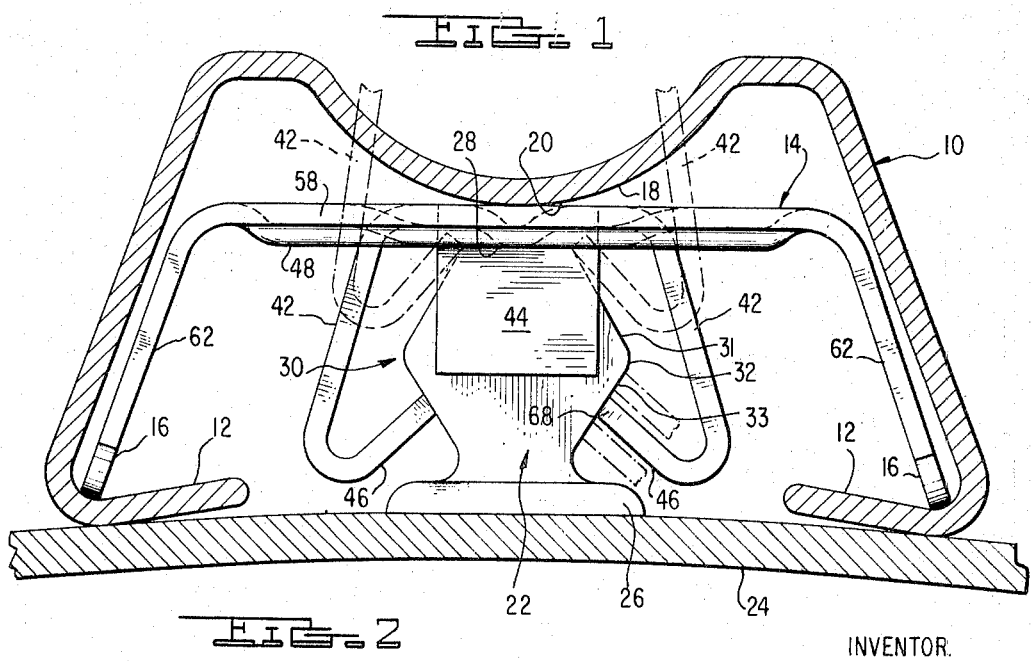
FIG. 2 is a cross sectional view of a trim strip with the clip of FIG. 1 finally formed and wedged therein, the resultant assembly being snapped on and seated in final position on a button extending from an automobile door, or the like, the catch panels of the clip being shown in dotted lines in various positions of assembly.

Referring to FIGS. 1–3, it will be seen that the trim strip 10 is a hollow member having oppositely inturned longitudinal inner flanges 12, the clip 14 engaging the flanges 12 with its runners 16 and engaging the undersurface 18 of the member 10 with its top 20. The clip 14 may be assembled by insertion at the end of the trim strip 10, a plurality of clips 14 being arranged in a predetermined pattern in accordance with the orientation of a plurality of buttons 22 welded to the automobile support 24 in a predetermined alignment.

The button 22 has a base 26 connected to the support 24 and extending upwardly therefrom. The button has a top surface 28 and a side surface 30, the side surface including a top conoidal cam 31, an intermediate annular convex band 32 and a bottom inverted conoidal face 33.

The female clip 14 as mentioned is formed from a blank 36 shown in FIG. 1 stamped from sheet material, the blank 36 indicating the utilization of substantially all of the material with material loss occurring as a rectangle at the socket area and as a telephone receiver like cutout at either side. As seen in FIGS. 2 and 3, the blank 36 of FIG. 1 is bent longitudinally at its top 20 at four locations to form two runners 16, 16 and two catch panels 42, 42, and transversely at two locations to form two cam panels 44, 44. A further longitudinal bending is accomplished at two locations to provide the inwardly and upwardly opposed catches 46, 46. Dotted lines on FIGS. 1 and 4 indicate bend lines.

It will be noted in FIGS. 4 and 5, which show a catch modification, that a similar blank 50 is utilized except that the catch panels 52, 52 have inverted U-shaped cuts 53, 53 which form inverted U-shaped cut-out portions or catches 54, 54 which are bent inwardly and upwardly with the end portions 55, 55 of the catch panels 52, 52 extending downwardly and outwardly beyond the juncture point with the inverted U-shaped cut-out portions 54, 54. Subject to this variation of the catch panels and their catches the description of the parts of FIGS. 1–3 is applicable to FIGS. 4 and 5.

T-shaped depending embossments 48, 48 are provided at the ends of the clip with the leg of the T extending longitudinally centrally along the main member 56 of the top 20, the top of the T expanding transversely partially across the transverse end members 58, 58 of the top 20 of the clip 14.

When formed the clip 14 is a longitudinal inverted U-shaped sled having side runners 16 which are upwardly curved toward both ends, the top 20 having a socket 60 (FIG. 3) depending therefrom.

Each of the runners 16 has an end leg 62 extending downwardly and transversely outwardly from longitudinally aligned corners of the top 20, with a resilient longitudinal web 64 bowed transversely downwardly and outwardly between its legs 62, 62. The web 64, which is formed of sheet material, is of a predetermined height with respect to the gauge or thickness of the sheet material to produce the resiliency or flexibility of the runner required for biased tensioned installation in the trim strip 10, the upward curvature at both ends facilitating insertion and movement in both longitudinal directions in the trim strip when inserted to enable frictional orientation of a plurality of clips in a predetermined spaced pattern.

The socket 60 of the clip 14 is preferably centrally located and has a plurality of panels extending downwardly from the top. In the embodiment shown, two longitudinal panels 42, 42 are catch panels each of which extend downwardly and have a catch 46 extending upwardly and inwardly, the catch 46 having a terminal end 68 which, as seen in FIGS. 2 and 5, establishes an angular relationship with the bottom conoidal face 33 of the button 22 when the clip 14 is in full seated condition as shown, so that the terminal end 68 is in abutting frictional inwardly-biased engagement with the button 22.

The engagement of the catch 46 with the button 22 enables certain dimensional and assembly tolerance variations since the bottom conoidal face 33 has a length a few times longer than the gauge or thickness of the sheet material forming the catch. The various end positions of the catch 46 on the bottom conoidal face 33 are shown in dotted lines in FIGS. 2 and 5, the catches being identified by numeral 54, 54 in FIG. 5.

The unstressed position of the catch panels 42, 42 in the modification of FIGS. 1–3 is shown in dotted lines in FIG. 2. It will be noted that the bottom surface of the catch 46, 46 adjacent its terminal end 68 serves as a catch cam for engaging the top conoidal cam 31 to flex the panels 42, 42 outwardly as the trim strip 10 and clip 14 are pressed inwardly, thereby allowing the catches 46, 46 to slide smoothly downwardly past the convex band 32 and ultimately drawing themselves into suitable final seated position. A somewhat similar disclosure is found in FIG. 5 where the dotted lines indicate the unstressed condition of the modified catch panels 52, 52 of FIGS. 4–5, it being noted that these catch panels extend inwardly toward each other in unstressed condition and attain an almost vertical attitude when in seated stressed condition as shown in full lines. It will be noted also that the portion of the catch panel forming the catch 54, 54 assumes a substantially curved coplanar alignment throughout.

The plurality of panels making up the socket 60 includes two transverse cam panels 44, 44 extending substantially vertically downwardly from the transverse edges of the rectangular opening in the top 20. Each cam panel 44, 44 extends substantially to the button engaging end 68 of the catch 46, and when in seated condition the cam panel 44 extends substantially to the level of the convex band 32. The cam panel 44 serves to accomplish final alignment of the clip 14 with its button 22, providing for the correction of small inadvertent positioning of the clip 14 in the trim strip 10. Preferably the opening in the top 20 is rectangular in shape whereby the cam panels 44, 44 define a button receiving socket length of approximately three times the diameter of the top surface 28 of the button 22 to compensate for minor misalignment.

Referring now to FIGS. 6–7, it will be seen that the button 80 may also be made from a blank 81 stamped from sheet material having base sections 82, bottom conoidal sections 83, annular convex band sections 84, top conoidal sections 85 and top surface sections 86, which when bent and formed produce the three dimensional button 80 of FIG. 6.

Opposite end portions 82 of the stamping 81 are shown in FIG. 7 as being of semicircular configuration. Integrally connected to the diametral edge of the end portions 82 are complementary intermediate portions 83a. Such intermediate portions have converging edges 83 extending from the diametral edge of the end portion to the median of the intermediate portion, and at such median point such edges converge as at 85. At the median point where edges 83 and 85 meet there is formed a band at 84 which upon subsequent folding or bending of the blank defines an annular convex band.

Integrally connected between and to the intermediate portions 83a is the head portion 86a. The stamping 81 is adapted to be bent throughout the intermediate and end portions to trough shape extending lengthwise of the stamping throughout such portions. The stamping is further bendable laterally at the joinder of the central and intermediate portions to bring the intermediate and base portions into complementary confrontation providing the aforedescribed specific shape of the button, namely, that it has a base section, a bottom conoidal section, an annular convex band section, a top conoidal section and a top surface section.

When the sheet metal button of FIG. 6 is welded to the support panel 24 at the base sections 82 as described in the aforesaid application, Serial No. 179,128, the sheet metal structure of the button is further rigidified. Construction of the button from a sheet metal stamping materially reduces the cost of button manufacture as compared to manufacture by screw-machinery. Sheet metal manufacture may compare favorably in some instances with manufacture by cold-heading techniques.

FIG. 8 shows a replacement button 90 having a screwdriver slot 91 in its top surface 92, and a self-threading tapered portion 93 depending from its base 94 for threaded attachment through a support. This replacement button finds use in repair shops and the like not having easy access to stud welding equipment or adhesive processes used in attaching the button in the preferred manner under mass production techniques.

What is claimed is:

1. A fastener assembly for attaching a hollow channel member to the surface of a support, comprising: a button having a base attached to said support and extending upwardly therefrom, said button having a top surface and a side surface, said side surface having a top conoidal cam, an annular convex band, and a bottom inverted conoidal face, a single piece female clip formed of a sheet material into a longitudinal inverted U-shaped sled having side runners upwardly curved toward both ends and a top having a socket depending therefrom, each of said runners having an end leg extending downwardly and transversely outwardly from longitudinally aligned corners of said top and a resilient longitudinal web bowed transversely downwardly and outwardly between its legs, said socket having a plurality of panels including two longitudinal catch panels extending downwardly from outer longitudinal edges of said top having an upwardly and inwardly extending catch being a few times longer in length than the diameter of said band of the button and frictionally engaging said button and two transverse cam panels each extending downwardly substantially between the transverse ends of the catch panels, each cam panel extending substantially vertically downwardly and frictionally engaging said button and seated to the level of said band of said button thereby serving as a push plate to accomplish limited longitudinal alignment with said button on assembly by engagement with said top conoidal cam, said clip being longitudinally slid into the hollow channel thereby providing a biased frictional contact therewith produced by the flexing of said webs.

2. In a fastener assembly for attaching a hollow channel to a surface of a support having a button secured thereto, an adaptor clip, comprising: a single piece female clip formed of sheet material into a longitudinally inverted U-shaped sled having side runners upwardly curved toward both ends and a top having a socket depending therefrom, said top having transverse end members and a main member extending longitudinally centrally of said end members, said main member having a longitudinally extending rectangular opening therein with transverse cam panels depending from each of the transverse short edges of said opening and at least one catch panel depending from the outer edge of said top adjacent one of the longitudinal long edges of said opening extending downwardly and having an upwardly and inwardly extending catch for frictionally receiving and retaining a button.

3. In a fastener assembly for attaching a hollow channel to a surface of a support having a button secured thereto, an adaptor, comprising: a single piece female clip formed of a sheet material into a longitudinally inverted U-shaped sled having side runners upwardly curved toward both ends and a top having a socket depending therefrom, each of said runners having an end leg extending downwardly and transversely outwardly from longitudinally aligned corners of said top and a resilient longitudinal web bowed transversely downwardly and outwardly between its legs, said socket having a plurality of panels extending downwardly from said top, at least one of said panels being a catch panel extending downwardly and having a U-shaped portion struck inwardly from the catch panel defining an inwardly and upwardly extending catch for frictionally retaining a button received therewithin, said clip adapted to be longitudinally slid into a hollow channel providing biased frictional contact therewith produced by the flexing of said webs.

References Cited by the Examiner
UNITED STATES PATENTS

| | | | |
|---|---|---|---|
| 2,616,142 | 11/1952 | Tinnerman | 52—511 |
| 2,933,791 | 4/1960 | Whyte | 52—718 |
| 2,955,690 | 10/1960 | Bedford | 52—718 |
| 3,138,225 | 6/1964 | Jansson | 52—718 |
| 3,153,468 | 10/1964 | Sweeney | 52—718 |
| 3,181,663 | 5/1965 | Mason | 52—718 |

FOREIGN PATENTS

| | | |
|---|---|---|
| 679,471 | 8/1939 | Germany. |
| 21,772 | 3/1907 | Great Britain. |

FRANK L. ABBOTT, *Primary Examiner.*

M. O. WARNECKE, R. A. STENZEL,
*Assistant Examiners.*